(12) United States Patent
Prasoonkumar et al.

(10) Patent No.: US 6,538,650 B1
(45) Date of Patent: Mar. 25, 2003

(54) EFFICIENT TLB ENTRY MANAGEMENT FOR THE RENDER OPERANDS RESIDING IN THE TILED MEMORY

(75) Inventors: Surti B. Prasoonkumar, Folsom, CA (US); Aditya Sreenivas, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/480,833

(22) Filed: Jan. 10, 2000

(51) Int. Cl.$^7$ ................................................ G06T 17/00
(52) U.S. Cl. ................................................. 345/419
(58) Field of Search .................... 305/418, 419, 305/421, 422, 531, 532, 533, 534, 535

(56) References Cited

U.S. PATENT DOCUMENTS

| | | | |
|---|---|---|---|
| 5,640,533 A | | 6/1997 | Hays et al. |
| 5,712,998 A | | 1/1998 | Rosen |
| 6,093,213 A | * | 7/2000 | Favor et al. ............... 703/27 |
| 6,362,826 B1 | * | 3/2002 | Doyle et al. ............ 345/532 |

* cited by examiner

*Primary Examiner*—Cliff N. Vo
(74) *Attorney, Agent, or Firm*—Blakley, Sokoloff, Taylor & Zafman LLP

(57) ABSTRACT

A method and apparatus for efficient translation lookaside buffer ("TLB") management of three-dimensional surfaces is disclosed. A three-dimensional surface is represented as a square pixel surface. The square-surface representation is stored in a single entry of the TLB.

20 Claims, 5 Drawing Sheets

EFFICIENT TLB ENTRY MANAGEMENT FOR THE RENDER OPERANDS RESIDING IN THE TILED MEMORY

BACKGROUND OF THE INVENTION

1. Field of the Invention

The present invention relates to microprocessor systems, and more particularly, to translation lookaside buffers for use is conjunction with high performance microprocessors.

2. Art Background

In order to avoid frequent, cycle consuming accesses of main memory, a graphics accelerator system frequently utilizes cache memory. Cache memory is typically comprised of a relatively small amount of static random access memory (SRAM) which is both physically faster than main memory and arranged such that it can be addressed more rapidly than main memory. The graphics accelerator within the system uses the faster cache memory to capture and store information as it is used. The information is stored within the cache memory in accordance with a predetermined mapping policy. Examples of such mapping policies include, direct mapping, set associative making, and fully associative mapping. The storage of information in a cache memory allows the graphics accelerator to quickly and advantageously obtain this information from the cache memory rather than from main memory. The intelligent design and use of a cache memory can substantially enhance the performance of the overall system.

Graphic accelerator systems also typically utilize virtual addressing. Virtual addressing enables the system to effectively create a virtual memory space larger than the actual physical memory space. A graphics accelerator can then advantageously operate in virtual address space using virtual addresses. Frequently, however, these virtual addresses must be translated into physical addresses. One way of accomplishing this translation of virtual addresses into physical addresses is to regularly access translation tables stored in main memory. However, regularly accessing translation tables in main memory tends to slow overall system performance. Accordingly, in order to avoid the need to regularly access translation tables in main memory to accomplish address translation, graphics accelerator systems often use a translation lookaside buffer (TLB) to store or cache recently generated virtual to physical address translations.

A translation lookaside buffer (TLB) can be thought of as a special type of cache memory. As with other types of caches, a TLB is typically comprised of a relatively small amount of memory specially designed to be quickly accessible. A TLB typically incorporates both a tag array and a data array. Within the tag array, each tag line stores a virtual address. This tag line is then associated with a corresponding data line in the data array which stores the physical address translation for the virtual address. Thus, prior to seeking a translation of a virtual address from translation tables in main memory, a graphics accelerator can first refer to the TLB to determine whether the physical address translation of the virtual address is presently stored in the TLB. In the event that the virtual address and corresponding physical address are presently stored is the TLB, the TLB responsively outputs the corresponding physical address, and a time-consuming access of main memory is avoided.

BRIEF DESCRIPTION OF THE DRAWINGS

Further details are explained below with the help of the examples illustrated in the attached drawings in which.

SUMMARY OF THE INVENTION

A method for representing a three-dimensional surface in a single entry of a translation lookaside buffer as a square surface is disclosed.

DETAILED DESCRIPTION

An efficient TLB entry management is described. In the following description, for purposes of explanation, numerous specific details including line sizes and bit values are set forth in order to provide a satisfactory understanding of the present invention. However, it will be apparent to one skilled in the art that such specific details are not essential to the practice of the present invention. Additionally, it will be appreciated that while the description which follows will refer to a particular architecture and particular translation lookaside buffer (TLB), the present invention is in no way limited to a particular processor, graphics accelerator, or TLB. In a number of figures, well known electrical structures and circuits are shown in block diagram form in order not to obscure the present invention unnecessarily.

Figure 1:
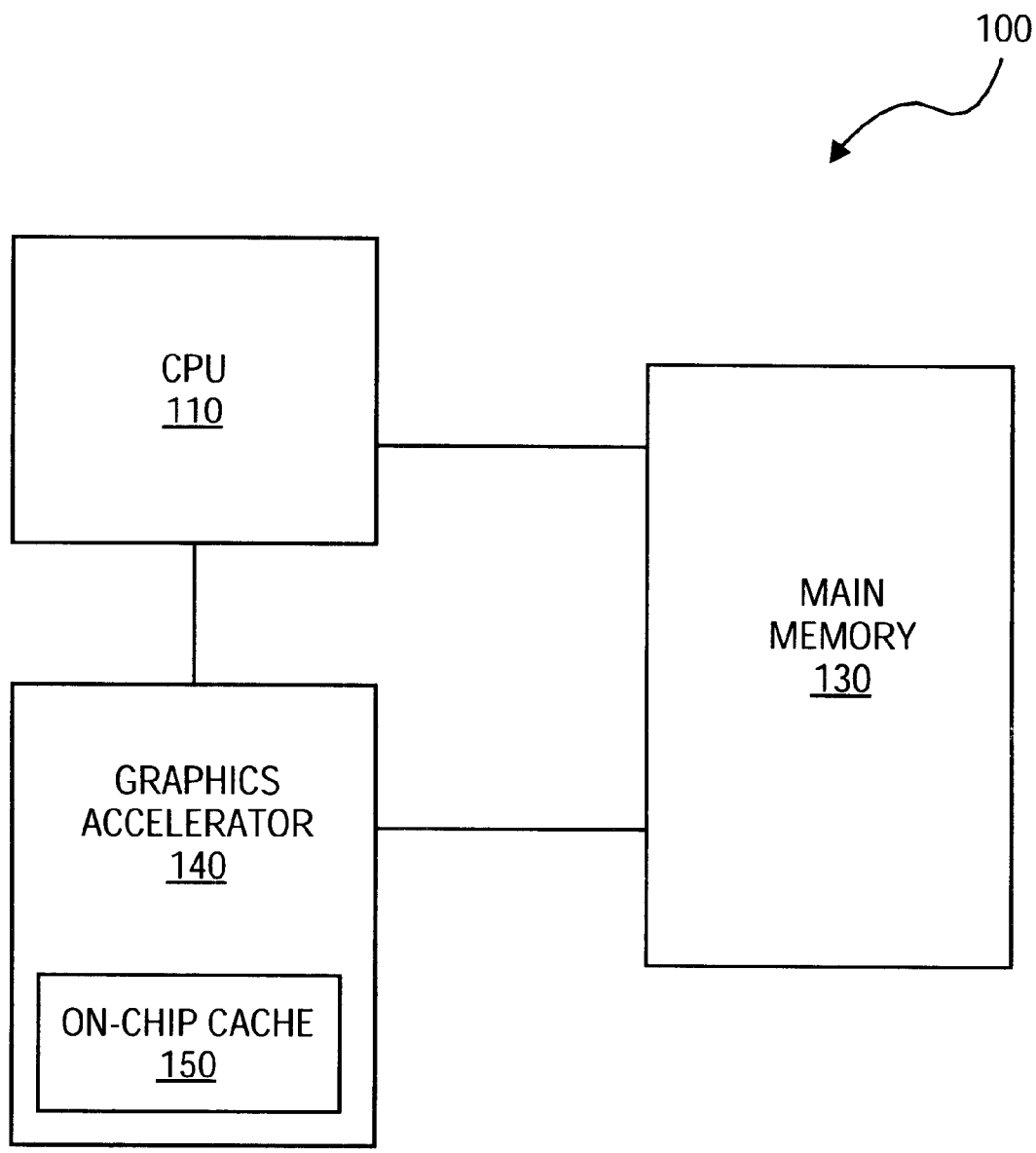
FIG. 1 illustrates one embodiment of a graphics display system.

Graphics display devices can display three-dimensional polygons (i.e. primitives). Turning now to FIG. 1 of the drawings, a block diagram of a computer graphics architecture 100 for displaying polygons is shown. A central processing unit (CPU) 110, which has a computer graphics application running thereon, generates a series of primitives for display on a display monitor (not shown). Generally, these primitives are three-dimensional polygons that provide the framework of the displayed object to which a particular texture is applied. The CPU 110 keeps track of the different types of textures available to the application and issues a command to a graphics accelerator (GA) 140 to map a specific one of these textures onto a corresponding primitive. Upon receiving this command from the CPU 110, the GA 140 engages in a rendering process wherein it retrieves specific texels (i.e. texture pixels) from a stored texture in main memory 130 and subsequently maps such texels on corresponding pixels of the primitive. The GA 140 can store the data retrieved from main memory 130 in a small on-chip cache 150.

The on-chip cache 150 includes a translation lookaside buffer (TLB), which increases the overall efficiency of the GA 140 by reducing the need to retrieve data from main memory 130. For example, graphics display systems utilize paging in order to manage memory resources. Paging is a memory management technique wherein a program is divided into uniform sized blocks called pages. Paging is used in support of various computer system features such as multi-tasking. In a paging system data is moved to and from system memory by pages.

Figure 2:
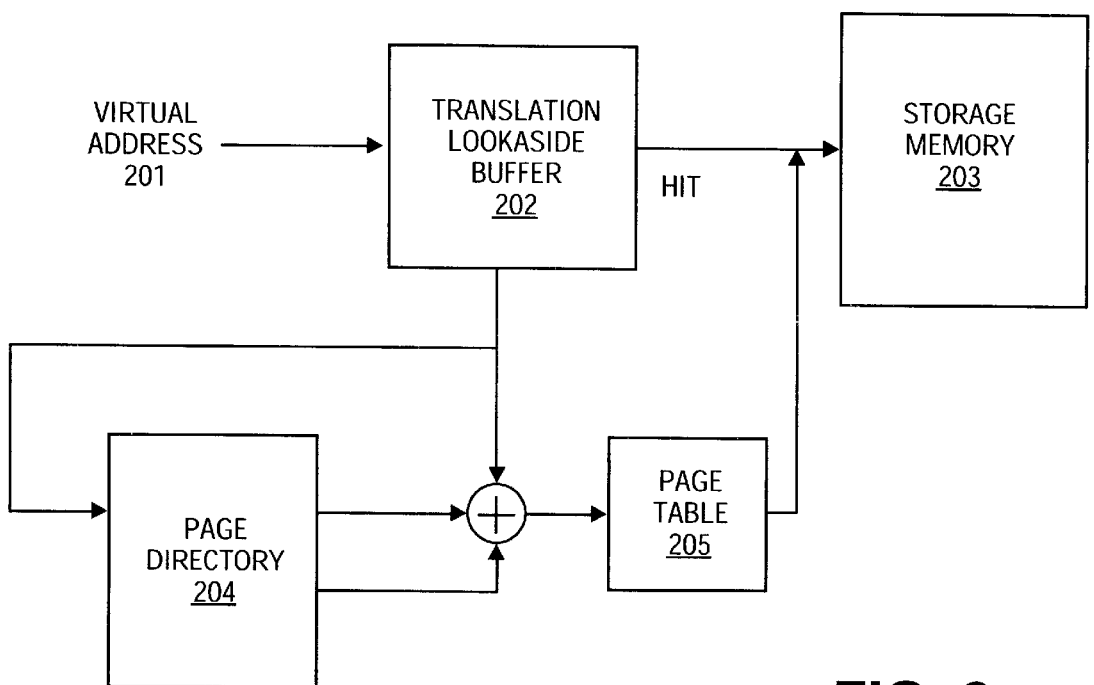
FIG. 2 is a block diagram of one embodiment of a paging unit.

A key aspect of paging is the translation of an address provided by a program, termed a virtual address, to a physical address. The physical address is the real address of the page of data in storage. The address translation scheme as utilized by a graphics accelerator, for example, is described with reference to FIG. 2. Referring to FIG. 2, a virtual address is provided to a paging unit. Note that a virtual address 201 is provided when servicing a page fault. A page fault occurs when a page accessed by an executing program is not in memory. The virtual address is first compared to entries in a translation lookaside buffer (TLB) 202. The TLB 202 is a cache of the most commonly referenced page table entries of a currently executing task. The page table entries contain the physical address for the page in a storage medium. If the virtual address is found, a TLB hit has occurred. Thus the desired physical address is found directly in the TLB. This is desirable since it avoids subsequent processing by the paging unit and results in an increased in speed in the translation of a virtual address to physical address.

If the virtual address is not found in the TLB 202, then the virtual address must be translated. A first portion of the virtual address is utilized to index to an entry in page directory 204. The page directory 204 is a table of indices into page table 205.

A second portion of the virtual address provides an offset to the page table index retrieved from the page directory 204 to create an index to one of the page table entries. Each page table entry in page table 205 contains the starting address of the page frame as well as statistical information about the page. This starting address is the desired physical address for the page.

Figure 3:
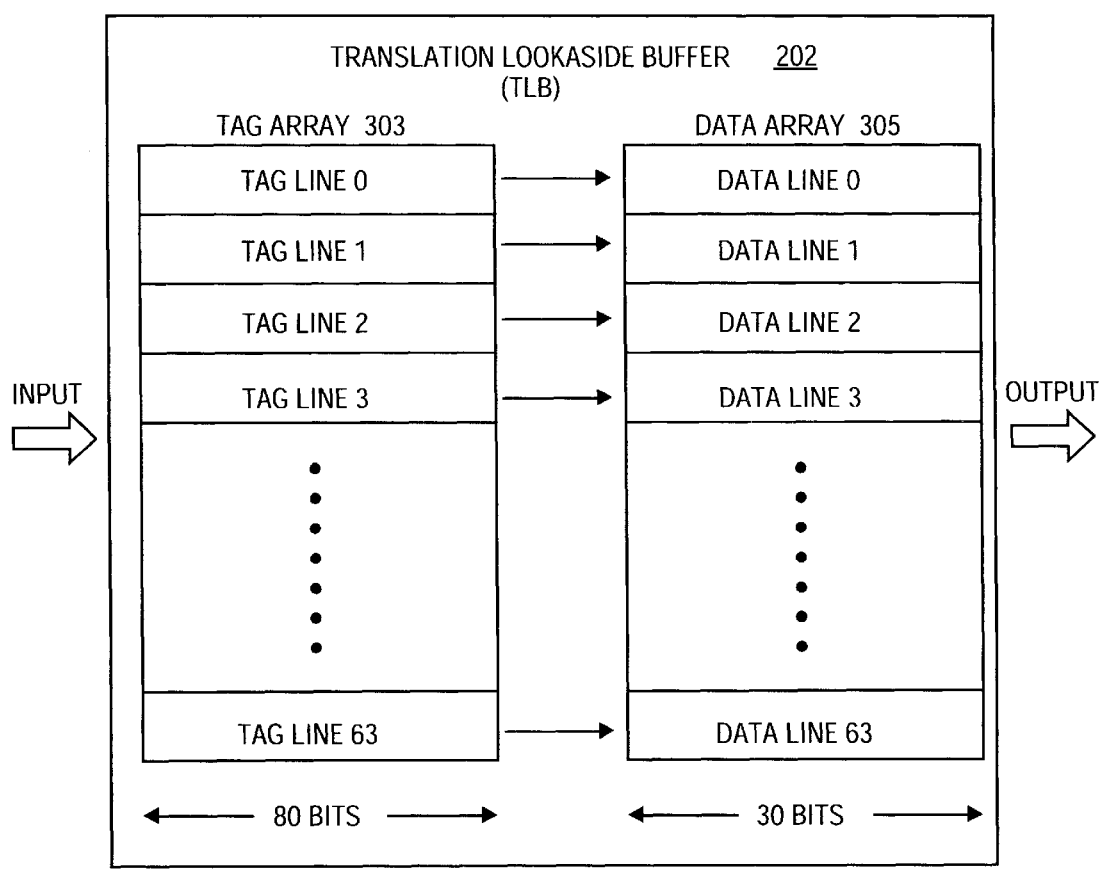
FIG. 3 illustrates one embodiment of a translation lookaside buffer.

With reference now to FIG. 3, this figure illustrates the basic organization of a translation lookaside buffer such as TLB 202. As shown, TLB 202 includes a tag array 303 and a data array 305. Tag array 303 provides for the stage of virtual address tags, while data array 305 provides for the storage of corresponding physical addresses. In the embodiment shown, both tag array 303 and data array 305 comprise 64 lines or entries. Each tag line in tag array 303 stores 80 bits, while each data line in data array stores 30 bits. In operation, a virtual address input (hereinafter referred to as the input address) is initially coupled to the TLB input. The input address is then compared to the virtual address tags stored in tag array 303. If the input address matches one of the virtual address tags, a TLB hit occurs, and the physical address corresponding to this virtual address tag is output from the TLB.

TLB 202 can be mapped in accordance with any one of a number of possible mapping policies. These might include, for example, direct mapping, set associative mapping, as fully associative mapping. To maximize the speed of operation, TLB 202 is advantageously mapped in accordance with a fully associative mapping policy. In operation, then, an input address is simultaneously compared to the virtual address tags in each and every tag line in tag array 303. Implementing such a capability, it will be appreciated, requires the use of N comparators, where N is equal to the number of tag lines, in this embodiment, 64. It will be appreciated that implementing a fully associative TLB, as opposed to a TLB mapped in accordance with one of the other mapping policies, will tend to require greater chip space.

Figure 4:
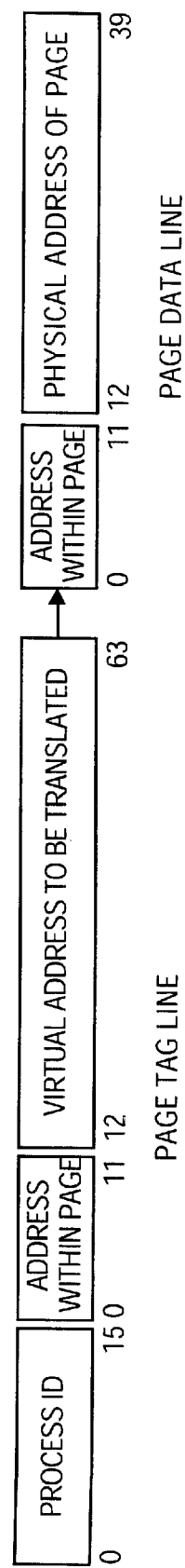
FIG. 4 illustrates one embodiment of how a page entry appears when stored in the translation lookaside buffer.

Referring now to FIG. 4, this figure illustrates a small page entry if stored in the translation lookaside buffer 202. In particular, FIG. 4 illustrates a sample breakdown of bits in a tag line and corresponding data line in the case of a relatively small page size, for example, 4K words. This page size corresponds to the organization of information in main memory. In a virtual memory system, when a GA wishes to access a particular location in main memory, it specifies both a virtual address for the page in main memory, which must be translated into a physical address for the page, and the address within that page which does not need to be translated.

Referring now to FIG. 4, while deferring discussion of the first 16 process m bits shown, a first set of address bits in the tag line are reserved for the address within the page, while a second set of bits are reserved for the virtual address to be translated. In the small page size of 4K words, 12 bits are sufficient to describe the address within each page. Accordingly, as shown, bits 0–11 are reserved for a designation of the address within each page. The remaining bits, bits 12–63, comprise the virtual address to be translated which will be compared to corresponding bits from the input address to determine whether a TLB hit has occurred. The data line which corresponds to this tag line, comprises a similar number of bits for the address within the page, bits 0–11, and a set of bits 12–39 which define the physical address of the page.

Thus, it will be appreciated from FIG. 4 that the page size dictates a particular breakdown of the bits in the tag and data lines of a TLB. The embodiment shown in this figure additionally appends to each tag line a number of bits reserved for process ID information (bits 0–15). This information is used to designate the process which owns the particular TLB entry such that, for example, a first process is prevented from using the TLB entries belonging to a second process. In this way, protection is provided for without the need to flush the TLB whenever processes are changed.

Figure 5:
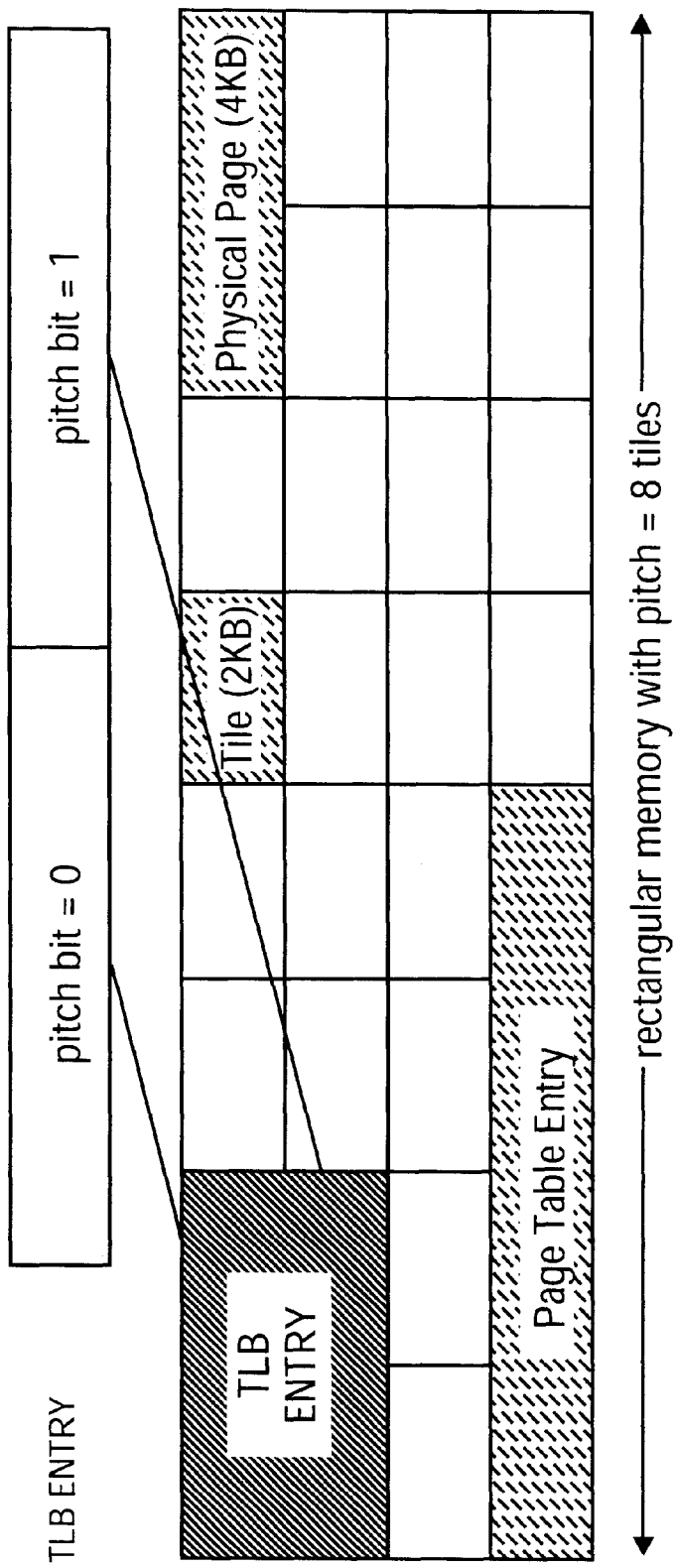
FIG. 5 illustrates one embodiment of tiled memory.

Turning now to FIG. 5, this figure shows how the page size affects the entry of operands into the TLB. FIG. 5 shows a rectangular, tiled memory with a pitch equal to eight tiles. Each tile, or word, is 2 kilobytes (KB) of memory. A physical page of memory is two tiles, or 4 KB. Each entry in the TLB is 4 Quadwords (QW), or 4 tiles.

The graphics accelerator (GA) 140 shown in FIG. 1 may have both two-dimensional (2D) and three-dimensional (3D) rendering engines. In one embodiment, 3D operands (color, Z) are operated upon by the GA in a square quantity called a span, which is data corresponding to 4 by 4 pixels. In another embodiment, a blit engine is a 2D rendering engine which operates on the source and destination surfaces one pixel at a time (like a scanline renderer).

Based on the depth of the pixel in bits per pixel (bpp), the data that the rendering engine operates upon can be a rectangular quantity in terms of bits. For a 16 bpp 3D operand, a span corresponds to 4 quadwords (QWs) stacked in the Y direction (assuming the scanline is in X direction). Similarly, a QW corresponds to 4 pixels in a cache line for a 2D operand. Therefore, a square pixel surface of a 3D operand can result in a rectangular memory. When such an operand is placed in the virtual memory with 16 QWs×16 lines rectangular tiles, the traversal algorithm for walking the 3D primitive may jump into the tile in the Y-direction or in the X-direction. In other words, the accesses can come in the X-direction or Y-direction with equal probability. Therefore, it is advantageous to map a square surface (in terms of pixels) in the TLB. For a 2D primitive, the accesses can more likely come in the X-direction. When a TLB resource is shared by two types of render engines, the above access patterns are exploited to manage TLB entries efficiently.

With this background, the components of entry management are: (i) identifying the render engine and the surface format; (ii) interpreting the TLB entries; and (iii) prefetching the TLB entries for page (4K which is 2 tiles in X direction) misses.

The following describes how these components operate together. The TLB for the rendering engine has entries, where each entry stores translation data for two pages. Now the page table stored in memory has each entry having translation for two tiles (4 KB) adjacent in X-direction. Because tiled rectangular memory can have a pitch of 1, 2, 4, 8, 16 or 32 tiles, in order to represent a square surface (in terms of pixels) for 3D operands, translations for two pages in Y-direction (the pages which are pitch apart) are stored in a single TLB entry. Similarly for 2D operands, translation for two pages adjacent in X-direction are stored in a single TLB entry.

It is interesting to note that pitch of 1 or 2 tiles desolves into the case where pitch apart pages are in fact in adjacent in X-direction. Hence, for a non-tiled surface for any render engine and for a tiled surface with pitch of 1 or 2 tiles, the natural entry from the page table becomes the TLB entry, otherwise, two half entries are combined to make one entry. While looking up the TLB in the first case, bit 12 of incoming address[31:0] is masked out to zero and in the second case, the pitch bit is masked out. Essentially pitch bit is bit 13, 14, 15 or 16 of the incoming address because this bit corresponds to the pitch of the tiled surface. Masking the pitch bit works because when these entries are stored there are translations for both pages corresponding to pitch bit=0 and pitch bit=1. Further, tags for TLB entries are also stored the same way by masking the pitch bit. It should be noted that in hardware masking means forcing to 0.

A third component of entry management that is prefetching the TLB entries based on above thesis. When a TLB miss occurs, for a 2D engine or non-tiled accesses for 3D or tiled accesses for 3D with pitch of 1 or 2 tiles, only one entry is fetched. In the case of other pitches, for a 3D access, two entries from page table are fetched: one with pitch bit=0 and the other with pitch bit=1 based on the bit 12 of the address it is decided which half of the entries are kept. Therefore, two pages in Y-direction have now translation available in the same TLB entry and a TLB miss is used as an opportunity to prefetch the other entry.

TLB misses are reduced by prefetching the entries which can be most likely used. Further in a UMA device, because of a good number of memory clients (e.g. isoch stream with a burst accesses, latency for initiating a read is very high for a low priority client like this TLB request. High latency can adversely affect the 3D render engine efficiency. Here two TLB requests are pipelined and therefore the latency for the second transaction is obviated. Further, this method of entry management ties up both renderers with different access patterns in a seamless manner for performance enhancement. Tiled memory improves the memory efficiency of such a graphics sub-system and this invention takes the fullest advantage of further improving efficiency.

What is claimed is:

1. A method comprising:
   representing a three-dimensional surface as a square pixel surface to generate a square representation; and
   storing the square representation as a single entry of a translation lookaside buffer.

2. The method of claim 1, further comprising:
   identifying a rendering engine as a three-dimensional rendering engine.

3. The method of claim 1, further comprising:
   determining whether the translation lookaside buffer contains a translation address for the three-dimensional operand; and
   determining, if the translation lookaside buffer does not contain a translation address for the three-dimensional operand, that a miss in the translation lookaside buffer has occurred.

4. The method of claim 1, wherein storing further comprises:
   storing a first address translation in a first data line of the single entry and storing a second address translation in a second data line of the single entry, the first and second address translations representing pages that are a pitch apart in the y direction of a tiled memory.

5. The method of claim 1, wherein:
   the square representation further comprises a first address translation for a first page of tiled memory and a second address translation for a second page of tiled memory;
   the first and second pages having identical positions in the x direction of the tiled memory; and
   the first and second pages being one pitch apart in the y direction of the tiled memory.

6. The method of claim 5, wherein:
   the tiled memory has a pitch greater than two.

7. The method of claim 1, wherein storing further comprises storing a first address translation and a second address translation in the single entry.

8. The method of claim 3, wherein representing further comprises:
   if a miss in the translation lookaside buffer has occurred,
   fetching a first address translation from a page table; and
   prefetching a second address translation from the page table.

9. The method of claim 8, wherein:
   fetching the first address translation further includes
   fetching a first entry from the page table to obtain a first fetched data, and
   determining which half of the first fetched data contains the first address translation; and
   prefetching the second address translation further includes
   prefetching a second entry from the page table to obtain a second fetched data, and
   determining which half of the second fetched data contains the second address translation.

10. A method, comprising:
    identifying whether a translation lookaside buffer contains a translation address for a desired page;
    if the translation lookaside buffer does not contain the translation address, fetching a first entry from a page table, the first entry containing the translation address for the desired page;
    prefetching, if the pitch of a tiled memory is greater than 2, a second entry from the page table, the second entry containing the translation address for a second page that is one pitch apart, in the y direction, from the desired page in the tiled memory; and
    storing the translation address for the desired page in an entry of a translation lookaside buffer.

11. The method of claim 10, further comprising:
    storing the translation address for the second page in the entry.

12. The method of claim 10, wherein:
    prefetching a second entry is performed responsive to a three-dimensional rendering engine being identified.

13. The method of claim 11, wherein the single entry includes two data lines and a single tag line.

14. The method of claim 10, wherein the single entry includes a single data line and a single tag line.

15. The method of claim 14, further comprising:
    storing, if a non-tiled surface is indicated, the translation address for the desired page in the single entry.

16. The method of claim 14, further comprising:

storing, if the pitch of the tiled memory is less than 2, the translation address for the desired page in the single entry.

17. A system, comprising:

a cache memory, the cache memory to store a tag array and a data array, one line in the tag array being associated wit two physical page translation address fields in the data array; and a graphics accelerator to, upon a miss in the cache memory, fetch a first physical page translation address from a page table;

the graphics accelerator further to store the first physical page translation address in the first physical page translation address field;

the graphics accelerator further to determine whether a three-dimensional rendering engine is indicated; and the graphics accelerator further to prefetch a second physical page translation address from the page table responsive to indication of the three-dimensional rendering engine.

18. The system of claim 17, wherein:

the graphics accelerator is further to store the second physical page translation address in the second physical page translation address field.

19. The system of claim 17, wherein:

the graphics accelerator is fierier to receive a virtual address associated with the first physical page translation address.

20. The system of claim 17, wherein:

the graphics accelerator is further to determine whether the virtual address is present in the tag array.

* * * * *

UNITED STATES PATENT AND TRADEMARK OFFICE
CERTIFICATE OF CORRECTION

PATENT NO. : 6,538,650 B1
DATED : March 25, 2003
INVENTOR(S) : Prasoonkumar et al.

It is certified that error appears in the above-identified patent and that said Letters Patent is hereby corrected as shown below:

Column 7,
Line 8, delete "wit" and insert -- with --.

Column 8,
Line 10, delete "fierier" and insert -- further --.

Signed and Sealed this

Seventh Day of September, 2004

JON W. DUDAS
*Director of the United States Patent and Trademark Office*